United States Patent [19]

Noguchi

[11] Patent Number: 4,971,611
[45] Date of Patent: Nov. 20, 1990

[54] DEHUMIDIFIED AIR GENERATOR EMPLOYING ADSORBENT
[75] Inventor: Haruo Noguchi, Yokohama, Japan
[73] Assignee: Colortronic Co., Ltd., Tokyo, Japan
[21] Appl. No.: 346,568
[22] Filed: May 2, 1989
[30] Foreign Application Priority Data Nov. 2, 1988 [JP] Japan .............................. 63-142711[U]
Nov. 9, 1988 [JP] Japan .............................. 63-145369[U]

[51] Int. Cl.$^5$ .............................................. B01D 53/06
[52] U.S. Cl. .......................................... 55/181; 55/390; 55/33
[58] Field of Search ...................... 55/75, 77, 389, 390, 55/181, 179, 33

[56] References Cited
U.S. PATENT DOCUMENTS 3,487,608  1/1970  Graff .................................. 55/179 X
4,038,054  7/1972  Graff .................................. 55/179
4,307,773  12/1981  Smith .................................. 55/390 X
4,522,726  6/1985  Berry et al. .......................... 55/390 X Primary Examiner—Charles Hart
Attorney, Agent, or Firm—Staas & Halsey

[57] ABSTRACT

A dehumidified air generator has a plurality of rotatable absorption columns filled with adsorbents for generating dehumidified air which will be used to dry a plastic material or the like. A directional control valve for switching between adsorbing and regenerating steps in the adsorption columns comprises a slide valve mechanism composed of a stator and a rotor slidably held against the stator. The rotor has a plurality of openings defined therein and communicating with inlet/outlet ports defined in side walls of the adsorption columns through tubes. By rotating the rotor in synchronism with the adsorption columns, the adsorbing and regenerating steps are switched to dehumidify, with the adsorbents, humid air introduced into the adsorption columns through the directional control valve and also to desorb the adsorbents for regenerating them.

9 Claims, 10 Drawing Sheets

|   | FIRST CYCLE | SECOND CYCLE |
|---|---|---|
| I | A  A  D  C | A  A  D  C |
| II | D  C  A  A | D  C  A  A |

A: ADSORBING STEP
D: DESORBING STEP
C: COOLING STEP

| | FIRST CYCLE | | | | SECOND CYCLE | | | |
|---|---|---|---|---|---|---|---|---|
| I' | A | A | D | C | A | A | D | C |
| II' | A | D | C | A | A | D | C | A |
| III' | D | C | A | A | D | C | A | A |
| IV' | C | A | A | D | C | A | A | D |

A: ADSORBING STEP
D: DESORBING STEP
C: COOLING STEP

DEHUMIDIFIED AIR GENERATOR EMPLOYING ADSORBENT

BACKGROUND OF THE INVENTION

1. Field of the Invention

The present invention relates to an apparatus for generating dehumidified air by employing an adsorbent such as of synthetic zeolite, and more particularly to a dehumidified air generator suitable for use in drying a plastic material which is to be molded to shape.

2. Description of the Related Art

Various known dehumidified air generators are generally grouped into (a) dehumidified air generators for use in chemical plants, (b) dehumidified air generators for use in air conditioning systems, and (c) dehumidified air generators for use in machines for drying plastic materials to be molded to shape. The dehumidified air generators under the category (c) are finding wide use as a source of dehumidified air for drying a plastic material (mostly in the form of pellets) down to a very low water content before it is charged into a plastic molding machine. These dehumidified air generating apparatus are of growing importance particularly because they are required for the manufacture of engineering plastics which have been developed in recent years.

Conditions for designing dehumidified air generators of the above classes (a) through (c) will be described below.

(a) Dehumidified air generators for use in chemical plants:

When a dehumidified air generator is designed for use in a chemical plant, it should produce air that has been dried to have a very low dew point (lower than $-70°$ C., for example). These dehumidified air generators are designed individually or customized in almost all applications. Since there are few apparatus size limitations, dehumidified air generators in this group can be designed to ideal specifications which meet operating principles of the generators. In many cases, large and complex dehumidified air generating systems are designed for desired performance.

(b) Dehumidified air generators for use in air conditioning systems:

Dehumidified air generators of this type find a larger market than those of the class (a). Dehumidified air produced by the dehumidified air generators is not required to have a considerably low dew point, but normally should have a dew point ranging from $+10°$ C. to $+12°$ C. (if air is to be dehumidified to a dew point of $+12°$ C., then air at $35°$ C. may be dehumidified to a relative humidity of 5%). Therefore, the dehumidified air generators can easily be designed.

(c) Dehumidified air generators for drying plastic materials:

Depending on the type and use of plastics to be dried, air should be dehumidified by a dehumidified air generator in this category down to a dew point that ranges from $-50°$ C. to $-60°$ C. Therefore, the dew point requirement is similar to that of the class (a). Inasmuch as even relatively small-sized plastic molding machines require dehumidified air generators, respectively, cost and space limitations on these dehumidified air generators are strict. It is impossible to scale down a dehumidified air generator which was designed for use in a chemical plant and use it for drying a plastic material.

Heretofore, dehumidified air generators for use as plastic material driers have been manufactured and sold without regard for basic technical conditions that should be met when using an adsorbent. Naturally, such dehumidified air generators have proven unsatisfactory in use, and have posed problems especially on certain plastics such as PET, for example, which depend on their water contents introduced into the molding machine for determining the properties of products molded of those plastic materials. Where there are stringent requirements as to the dehumidification of plastics such as PET, most of the conventional dehumidified air generators cannot be used. Even if some of them can be used, they are oversized and require a wasteful expenditure of installing and running costs.

Technical conditions to be met by a dehumidified air generator which uses an adsorbent are as follows:

(1) Assuming that air flows in a normal direction for adsorption in each step, desorbing air at a high temperature ranging from $250°$ C. to $300°$ C. should flow in the direction opposite to the normal direction.

(2) Low-temperature air in a step after desorption, i.e., a cooling step, should flow in the normal direction.

(3) It is highly preferable that air to be used in the cooling step be dehumidified air.

(4) In an adsorbing step, there is an optimum air flow rate in a range determined by the type and particle diameter of an adsorbent. To keep the air flow rate in that range, it is necessary to provide a cross-sectional area of an adsorbent layer which is suitable for the flow rate of air to be dehumidified, and hold the cross-sectional area perpendicular to the direction in which the air to be dehumidified flows.

(5) It is necessary that the adsorbent layer have a minimum required thickness in the direction of flow of the air to be dehumidified, for achieving a desired dew point and keeping that dew point for a suitable period of time.

If a dehumidified air generator having a plurality of adsorbing columns satisfies the conditions (1) through (5) while successively switching between cycles of adsorbing and regenerating steps (i.e., desorbing and cooling steps), gas passages for the respective step cycles are complicated because of the conditions (1), (2), (3), and a number of automatic directional control valves are required to switch between the gas passages.

An adsorption drier including a flat-type slip valve which is free from the complex gas passages and the directional control valves is disclosed, for example, in Japanese Laid-Open Patent Publication No. 46-7440 claiming Convention priority based on German Patent Application No. P202505.5 filed on May 23, 1970. As shown in FIGS. 1 and 2 of this publication, a plurality of adsorption columns are horizontally arranged around a vertical rotational shaft, and discs are hermetically coupled to the upper and lower ends of the adsorption columns and positioned upwardly and downwardly of the adsorption columns. The disc is rotatable in unison with the rotors of valves mounted on the disc and held closely against a confronting nonrotatable disc. The nonrotatable disc has openings aligned respectively with the areas where adsorbing and regenerating steps are effected. The openings are held in communication through gas passages with the devices which perform the adsorbing and regenerating steps. In an actual system incorporating the principles of the disclosed adsorption drier, an adsorbent is stored in the gap between vertical double tubes to provide an adsorbent layer with a sufficient vertical cross-sectional area (as defined by the above condition (4)) with respect to air that flows in a horizontal direction. Since the adsorbent layer surface across and through which air passes in each of the adsorption columns extends vertically, it is possible to minimize the installation area for the adsorption drier.

If the adsorbent layer surface extended horizontally and air passed vertically therethrough in the disclosed arrangement, the diameter of each adsorbing column would be much greater than that which is disclosed in the publication. Consequently, while the disclosed adsorption drier can meet the conditions (1) and (2), it cannot satisfy both the conditions (4) and (5) while minimizing the installation space. More specifically, if the installation area is reduced, then it is unable to meet the condition (5) which requires the adsorbent layer to have a sufficient thickness. Another problem with the known structure in which air is horizontally passed across and through the vertical surface of the thin adsorbent bed is that the packing density of the adsorbent is rendered irregular due to gravity and hence the speed of air passing through the adsorbent layer is also made irregular. Moreover, the adsorption columns (normally four or five adsorption columns) which are disposed around the vertical rotatable shaft give a considerable large diameter to the entire rotatable assembly, and are not appropriate for use in a plastic molding plant as it takes up a large installation area.

Japanese Laid-Open Patent Publication No. 49-7166 claiming Convention priority based on German Patent Application No. P2214662.9 filed on Mar. 25, 1972, appears to disclose superficially a plurality of vertically stacked adsorption columns. However, it should be noted that actually, such vertically stacked adsorption columns are not disclosed in this publication for the following reason.

The external dimensions of directional control valves are shown as being quite large as compared with the diameters of inlet and outlet holes (1b, 11b). This indicates that FIGS. 2 and 4 of the publication are conceptual. Conversely, the dimensions of chambers (adsorption columns) filled with molecular sieves (adsorbent) in FIGS. 2, 4, and 6 of the publication are shown as much smaller than the external dimensions of the directional control valves. Technically, it is necessary that the external dimensions of the chambers be much larger than those of the directional control valves even if the directional control valves are not reduced in external dimensions. This fact also shows that FIGS. 2 and 4 of the publication are merely of a conceptual nature.

The publication fails to refer to the arrangement and advantages of the adsorption chambers, and does not specifically indicate how the adsorption chambers are attached to valve plates.

In addition, although FIG. 6 shows that the adsorption chambers are horizontally arranged and air flows horizontally, any comparison with a vertical stack of adsorption chambers is not described at all.

FIGS. 2, 4, 5, and 6 of the publication show the upper and lower valve plates in perspective, whereas lower components such as a heater, an air blower, etc., are depicted as a circuit diagram. Accordingly, the dimensions and positions of the adsorption chambers 5, 6 and conduits connecting them to the valve plates have no significance as indicating directions in these figures. FIGS. 2, 4, 5, and 6 serve the purpose of indicating the angular positions of the holes in the valve plates and their function, with the remaining portions being added simply as system diagrams.

As a consequence, FIGS. 2 and 4 do not indicate that the adsorption chambers are vertically stacked, and any vertical stack of adsorption chambers is not disclosed inasmuch as no operation and advantages whatsoever are described with respect to a vertical stack of adsorption chambers.

SUMMARY OF THE INVENTION

In view of the aforesaid problems of the conventional dehumidified air generators, it is an object of the present invention to provide a dehumidified air generating apparatus employing an adsorbent, which can meet the technical conditions (1) through (3), described above, without employing a complex system of air flow passages in successively switching between adsorbing and reproducing steps in a plurality of adsorption columns, and which can satisfy the conditions (4) and (5) without increasing the installation space for the adsorption columns.

Another object of the present invention is to provide a dehumidified air generator employing an adsorbent, which can meet all the technical conditions (1) through (5), and which requires a reduced installation space and can be manufactured at a reduced cost.

Still another object of the present invention is to provide a dehumidified air generator employing an adsorbent, which can meet all the technical conditions (1) through (5), and which allows an adsorbent to be replaced quite easily, does not increase the overall height of the generator even if the number of adsorption columns used is increased, and minimizes an installation space.

According to the present invention, there is provided a dehumidified gas generator comprising: a plurality of simultaneously rotatable adsorption columns having respective adsorbent beds housed therein; a rotor rotatable in synchronism with said adsorption columns; a stator fixedly disposed in confronting relation to said rotor; said rotor and said stator jointly serving as a directional control valve for switching between adsorbing and regenerating steps in each of said adsorption columns; adsorbing means composed of said adsorption columns combined together, said adsorbing means having a cylindrical shape divided into a plurality of chambers housing adsorbents of said adsorbent beds; rotating means for coupling said adsorption columns in the cylindrical shape to each other and rotating the adsorption columns in synchronism with said rotor; tubes having ends communicating with inlet/outlet ports defined in outer walls of said adsorbing means for passing a gas to be dehumidified through the adsorbent beds each having a predetermined thickness, from one surface to the opposite surface of each of the adsorbent beds; said rotor having a plurality of openings defined therein and connected to opposite ends of said tubes; and the arrangement being such that the adsorbing and regenerating steps in said adsorption columns can be switched by angularly displacing said rotor and said stator with respect to each other with said rotating means.

According to one aspect of the present invention, the adsorption columns are disposed in different vertical positions, respectively, the adsorption columns being projected onto a horizontal plane in at least partly overlapping shapes and mounted on a support device rotatable about a straight axis extending vertically through the adsorbent bed in at least one of the adsorption columns.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
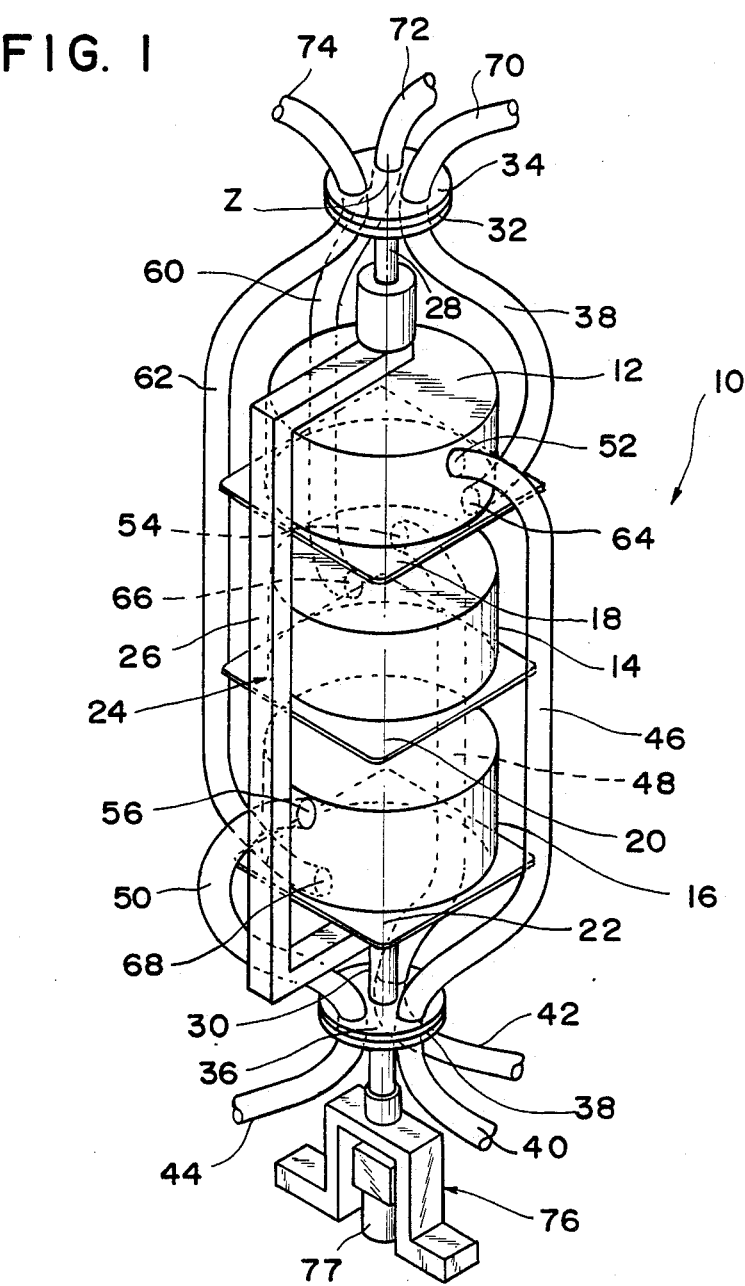
FIG. 1 is a perspective view of a dehumidified air generator according to a first embodiment of the present invention.

As shown in FIG. 1, a dehumidified air generator, generally designated by the reference numeral 10, according to a first embodiment of the present invention has three cylindrical adsorption columns 12, 14, 16 which are vertically stacked. The adsorption columns 12, 14, 16 are mounted respectively on flat plates 18, 20, 22 attached to a support device 24 which comprises a substantially C-shaped member 26 and vertical rotatable shafts 28, 30 mounted respectively on the upper and lower ends of the member 26.

A rotor 32 and a stator 34 facing and fixed to the rotor 32 are disposed upwardly of the three adsorption columns 12, 14, 16, and a rotor 36 and a stator 38 facing and fixed to the rotor 36 are similarly positioned downwardly of the three adsorption columns 12, 14, 16. Gas passages 40, 42, 44 in the form of flexible tubes are connected to the lower stator 38, and gas passages 46, 48, 50 in the form of flexible tubes have ends connected to the rotor 36. The other end of the gas passage 46 is joined to an inlet/outlet port 52 defined in an upper side wall of the adsorption column 12. The other end of the gas passage 48 is joined to an inlet/outlet port 54 defined in an upper side wall of the adsorption column 14. The other end of the gas passage 50 is joined to an inlet/outlet port 56 defined in an upper side wall of the adsorption column 16. Gas passages 58, 60, 62 in the form of flexible tubes are coupled at ends thereof to the upper rotor 32. The other end of the gas passage 58 is joined to an inlet/outlet port 64 defined in a lower side wall of the adsorption column 12. The other end of the gas passage 60 is joined to an inlet/outlet port 66 defined in a lower side wall of the adsorption column 14. The other end of the gas passage 62 is joined to an inlet/outlet port 68 defined in a lower side wall of the adsorption column 16. Gas passages 70, 72, 74 in the form of flexible tubes are connected to the stator 34. Although the gas passages 40, 42, 44, 46, 48, 50, 58, 60, 62, 70, 72, 74 are described as comprising flexible tubes, they are not limited to the flexible tubes.

The rotor 32 is fixed to the rotatable shaft 28, whereas the rotor 36 is fixed to the rotatable shaft 30, which extends downwardly through the stator 38 and is rotatably supported on a support base 76. The lower end of the rotatable shaft 30 is connected to an actuator 77 which may comprise a motor with a speed reducer.

Air flows, the gas passages, and dehumidifying operation in the dehumidified air generator 10 will be described with reference to the block diagram of FIG. 2. It is assumed in FIG. 2 that the adsorption column 12 is in an adsorbing step, the adsorption column 14 a cooling step, and the adsorption column 16 a desorbing step.

Figure 3:
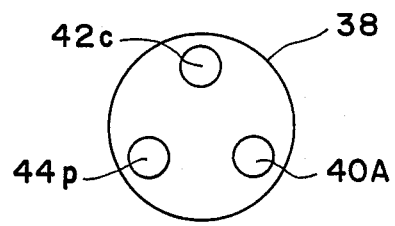
FIG. 3 is a plan view of a stator used in the dehumidified air generator of the first embodiment

A humid plastic material is dried by dehumidified air in a hopper 78, and the dried plastic material is supplied from the hopper 78 into a plastic molding machine (not shown). Humid air discharged from an outlet 80 of the hopper 78 flows through a gas passage 82 and then through a filter 84 and a cooler 86 into an air blower 88. The cooler 86 is employed because humid air can well be dehumidified when it is of a low temperature. The filter 84 and the cooler 86 may be positionally switched around. The air blower 88 has an outlet port connected to the gas passage 40 that is coupled to the stator 38. As shown in FIG. 3, the stator 38 comprises a disc having three angularly equally spaced openings 40A, 42C, 44D defined therein and communicating with the gas passages 40, 42, 44, respectively. The rotor 36 disposed on the stator 38 is also in the form of a disc having three angularly equally spaced openings (not shown) communicating respectively with the gas passages 46, 48, 50.

The rotor 36 and the stator 38 are slidably held against each other, jointly serving as a slide valve. The opening 40A in the stator 38 to which the gas passage 40 is joined communicates with the opening (not shown) in the rotor 36 in a hermetically sealed relation. In the position shown in FIG. 2, the gas passage 40 is connected in a hermetically sealed relation to the gas passage 46 through the stator 38 and the rotor 36. Likewise, the gas passages 42, 44 are connected in a hermetically sealed condition to the gas passages 48, 50, respectively, through the stator 38 and the rotor 36 in the position of FIG. 2.

The gas passage 46 which is coupled to the gas passage 40 through the stator 38 and the rotor 36 is connected to the inlet/outlet port 52 of the adsorption column 12. The adsorption column 12 has an adsorbent bed 90 housed therein and having a cross-sectional area which meets the condition (4) described above and a thickness which meets the condition (5) described above. Similarly, the adsorption columns 14, 16 have respective adsorbent beds 92, 94 housed therein.

The humid air supplied from the gas passage 46 is dehumidified when it flows through the adsorbent bed 90. Dehumidified or dried air then flows through the inlet/outlet port 64 into the gas passage 58, and reaches the rotor 32. As with the rotor 36 and the stator 38, the rotor 32 and the stator 34 jointly serve as a hermetically sealed slide valve. In the position of FIG. 2, the gas passages 58, 60, 62 are held in communication with the gas passages 70, 72, 74 through openings (not shown) defined in the rotor 32 and the stator 34. The dried air from the gas passage 58 is thus delivered into the gas passage 70 without leakage. Since the gas passage 70 is connected to a dried air inlet 98 of the hopper 78, the dried air (which is of a temperature ranging from 60° C. to 170° C.) is supplied from the inlet 98 into the hopper 78 in which a humid plastic material that has been charged into the hopper 78 through a feed port 100 is dried by the dried air. The air then becomes humid, and fed through the outlet 80 into the gas passage 82. The dried plastic material is supplied into the non-illustrated plastic molding machine through a discharge port 102.

The gas passage 70 coupled to the stator 34 is branched into a gas passage 104 which is connected to the gas passage 42 through a coupling means (not shown). Therefore, a portion of the dried air that has been dehumidified by the adsorption column 12 is supplied via the gas passage 42, the stator 38, the rotor 36, and the gas passage 48 into the adsorption column 14 to cool the adsorption column 14 after it has been desorbed by heated air.

The air (dried air) flowing out of the adsorption column 14 passes through the gas passage 60, the rotor 32, the stator 34, and the gas passage 72, which is joined to the gas passage 82. Instead of joining the gas passage 72 to the gas passage 82, the gas passage 72 may be connected to the gas passage 70 through a gas passage 73 indicated by the dotted line in FIG. 2.

The desorbing step in the adsorption column 16 is effected as follows: Ambient air is drawn through a filter 106 and a gas passage 108 into the gas passage 74 by means of an air blower 110. The air thus introduced into and flowing through the gas passage 74 is heated by a heater 114. The heated air (which is of a temperature in the range of from 250° C. to 300° C.) flows through the stator 34, the rotor 32, and the gas passage 62, and is then fed through the inlet/outlet port 68 into the adsorption column 16 in which the heated air desorbs the adsorbent bed 94 after it has adsorbed a prescribed amount of humidity or humidity over a prescribed period of time. After having desorbed the adsorption bed 94, the heated air flows out of the adsorption column 16 through the inlet/outlet port 56, and is discharged into the atmosphere through the gas passage 50, the rotor 35, the stator 38, and the gas passage 44.

The time required to complete the desorbing step is much shorter than the time required for the adsorbent to adsorb humidity to the extent that it needs to be desorbed. In view of this, a sensor 116 such as a humidity sensor is disposed in the gas passage 44 for detecting when the adsorbent bed is sufficiently desorbed and regenerated. An output signal from the sensor 116 is applied via lines 118, 120 to the air blower 110 and the heater 114 to stop the operation of the air blower 110 and the heater 114. With this arrangement, the energy consumed by the air blower 110 and the heater 114 can be saved.

Figure 2:
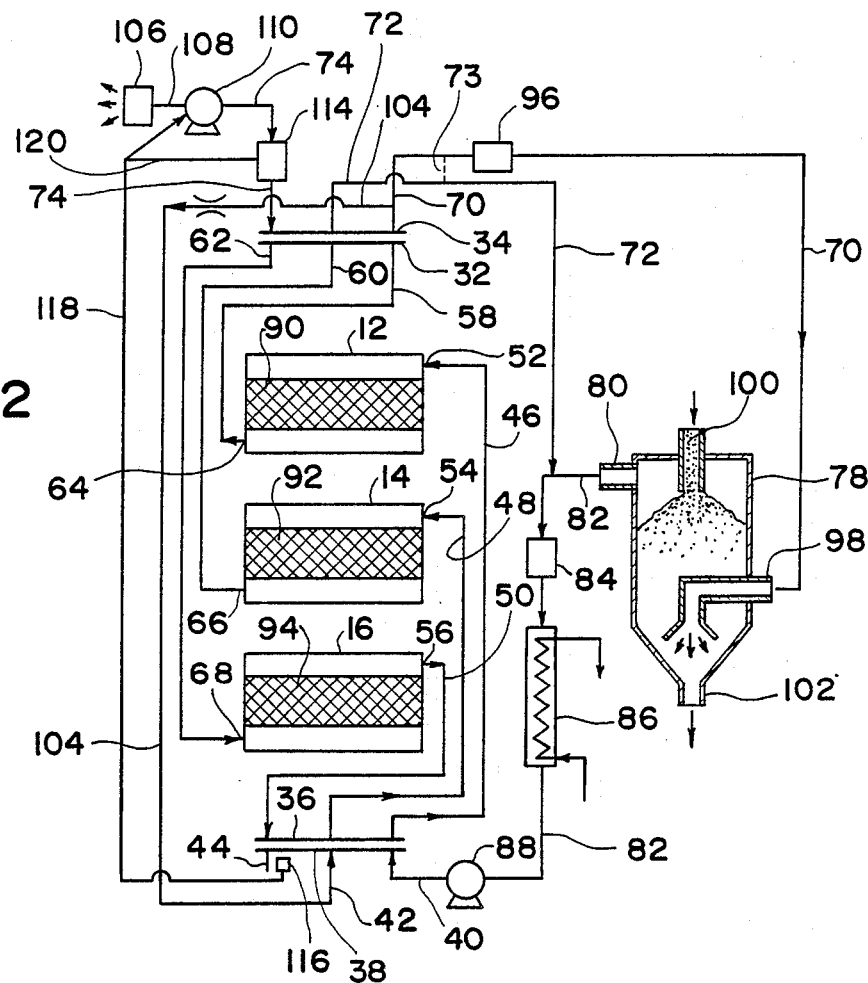
FIG. 2 is a block diagram, partly shown in cross section, illustrating air flows in the dehumidified air generator according to the first embodiment.

When the adsorbent bed 90 in the adsorption column 12 is to be desorbed in the position of FIG. 2, the adsorption columns 12, 14, 16, the rotors 32, 36, and the support device 24 (FIG. 1) are rotated by the actuator 77 to change the steps to be performed by the adsorption columns 12, 14, 16. More specifically, as shown in FIG. 1, the adsorption columns 12, 14, 16, the rotors 32, 36, and the support device 24 are rotated together by the actuator 77 about a Z-axis, i.e., a straight line connecting the rotatable shafts 28, 30 of the support device 24, thus rotating the gas passages 46, 48, 50, 52, 54, 56 about the Z-axis without varying their positions relative to the adsorption column 12, 14, 16 and the rotors 32, 36. The rotors 32, 36 are now angularly displaced with respect to the respective stators 34, 38. For example, as illustrated in FIG. 2, the gas passages 40, 48 are connected to each other through the stator 38 and the rotor 36, and the gas passages 60, 70 are connected to each other through the rotor 32 and the stator 34, so that the adsorption column 14 is switched from the cooling step to the adsorbing step. At the same time, the gas passages 44, 46 are connected to each other and the gas passages 58, 74 are connected to each other to switch the adsorption column 12 from the adsorbing step to the desorbing step. The gas passages 42, 50 are coupled to each other and the gas passages 62, 72 are coupled to each other to switch the adsorption column 16 from the desorbing step to the cooling step.

Thereafter, each of the adsorption columns 12, 14, 16 can repeat the cycle of the adsorbing, desorbing, and cooling steps.

In FIG. 1, the weights of the adsorption columns and the gas passages are borne by the support device 24, particularly, the rotatable shaft 30 and the support base 76, but not by the rotor 36 and the stator 38. Therefore, the rotor 36 and the stator 38 may be of relatively small dimensions, and the sealing ability of the slide valve composed of the rotor 36 and the stator 38 may be increased.

It can be understood from FIG. 1 that the installation area or space for the dehumidified air generator 10 is reduced substantially to an area in which one adsorption column is projected onto a horizontal plane. Accordingly, the installation space for the dehumidified air generator 10 is very small.

According to the first embodiment of the present invention, the adsorption columns 12, 14, 16 are vertically stacked and rotatable about the vertical axis extending through the centers of the adsorption columns 12, 14, 16. This arrangement reduces the installation space for the dehumidified air generator 10 while satisfying the conditions (1) through (5) referred to above. The rotatable drive shaft 30 coupled to the actuator 77 extends through the center of the slide valve near the actuator 77, with the stator 38 being independent of the drive shaft 30. Since the entire weight of the adsorption columns 12, 14, 16 is borne by the drive shaft 30 but not by the rotor 36, the rotor 36 may be of a mechanical strength which is large enough as a member of the slide valve. The rotor 36 and the drive shaft 30 may be coupled to each other only with a mechanical strength large enough to transmit rotative power from the drive shaft 30 to the rotor 36. Accordingly, the rotor 36 and the stator 38 may be reduced in size, and the sealing ability of the slide valve composed of the rotor 36 and the stator 38 can be increased. Inasmuch as the cooling step can be carried out by dehumidified air, the amount of humidity that can be desorbed may be made twice that which is desorbed by ambient air that is cooled.

Irrespective of the relative angular positions of the rotor and the stator, each of the adsorption columns 12, 14, 16 can be removed for easy maintenance. Another advantage of the dehumidified air generator is that the gas passages, i.e., the passages of air, can be designed with freedom.

A dehumidified air generator according to a second embodiment will be described below with reference to FIGS. 4 and 5.

Figure 4:
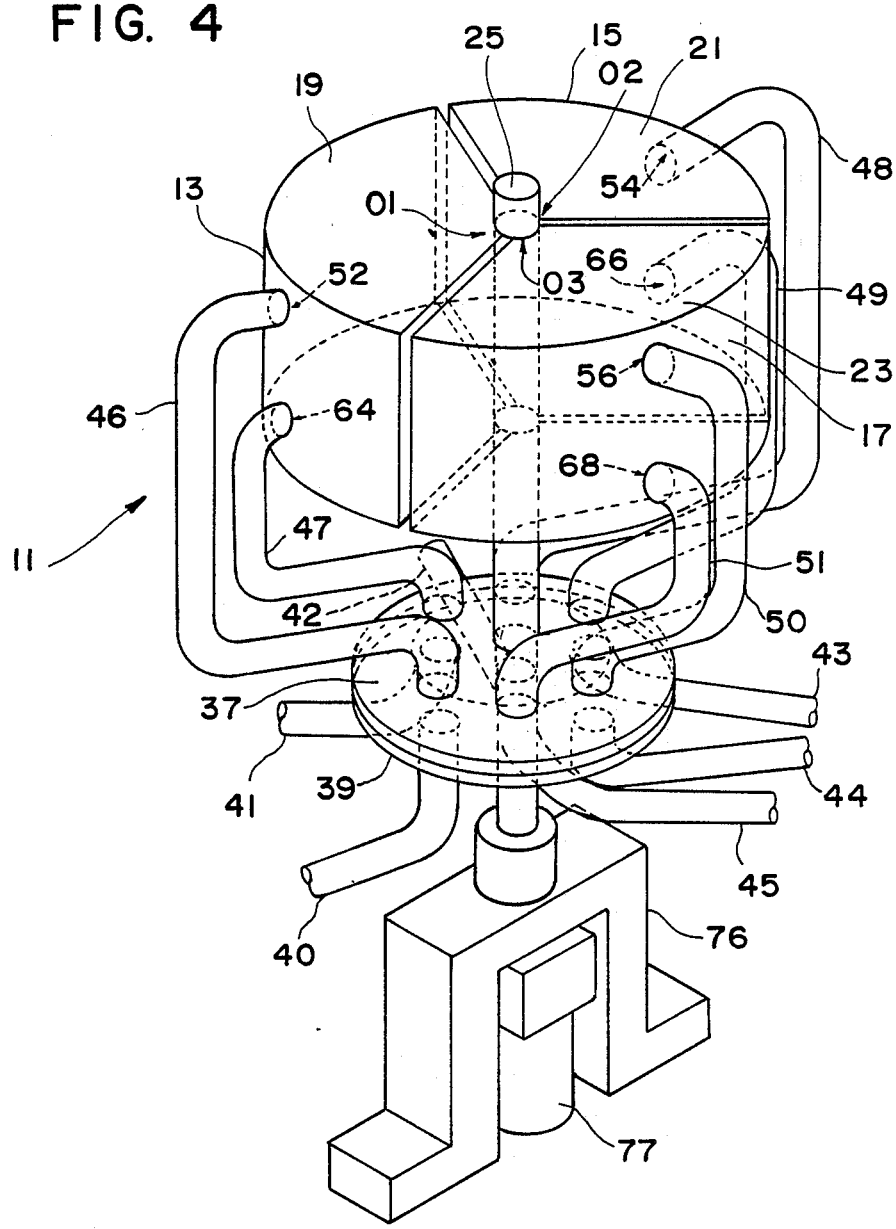
FIG. 4 is a perspective view of a dehumidified air generator in accordance with a second embodiment of the present invention.
Figure 5:
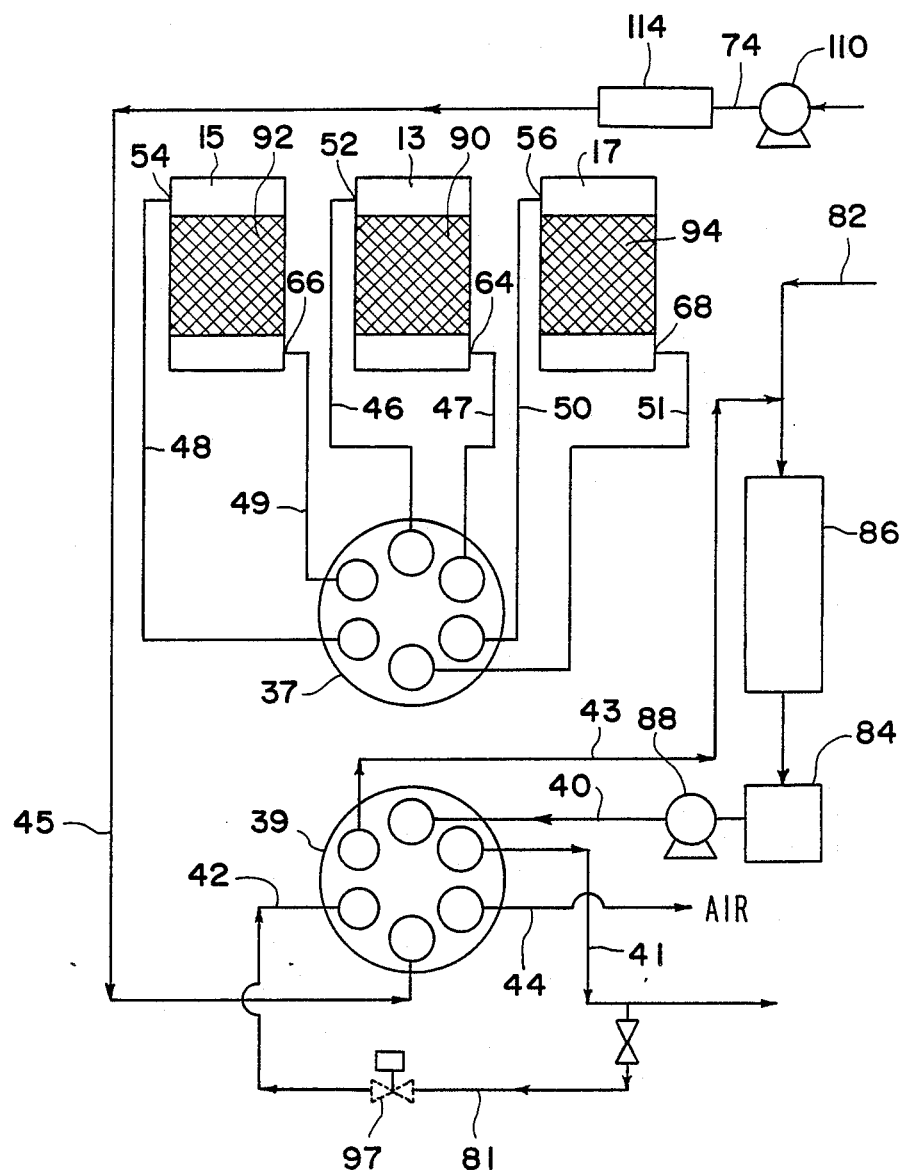
FIG. 5 is a block diagram showing air flows in the dehumidified air generator of the second embodiment.

As illustrated in FIG. 4, the dehumidified air generator, generally denoted as 11, has three adsorption columns 13, 15, 17 which are disposed in the same vertical position. Each of the adsorption columns 13, 15, 17 is of such a shape that it is projected onto a horizontal plane in the shape of a sector. Adsorbent replacement covers 19, 21, 23 are placed respectively over upper open ends of the adsorption columns 13, 15, 17. The adsorption columns 13, 15, 17 are attached to a rotatable shaft 25 at their vertexes 01, 02, 03.

A rotor 37 and a stator 39 facing and fixed to the rotor 37 are positioned below the three adsorption columns 13, 15, 17. The rotor 37 and the stator 39 jointly serve as a flat-type slide valve, and each have six openings which are angularly equally spaced.

Gas passages 46, 47, 48, 49, 50, 51 have ends hermetically connected to the respective openings in the rotor 37, and gas passages 40, 41, 42, 43, 44, 45 have ends hermetically coupled to the respective openings in the stator 39. The other end of the gas passage 46 is hermetically joined to an inlet/outlet port 52 defined in an upper side wall of the adsorption column 13, whereas the other end of the gas passage 47 is joined to an inlet/outlet port 64 defined in a lower side wall of the adsorption column 13. Similarly, the other ends of the gas passages 48, 49, 50, 51 are joined to inlet/outlet ports 54, 66, 56, 68 defined in the adsorption columns 15, 17.

The rotatable shaft 25 is fixed to the rotor 37 and extends through the stator 38. The rotatable shaft 25 is rotatably supported by a support base 76 and has a lower end coupled to an actuator 77 such as a motor. Therefore, the adsorption columns 13, 15, 17, the rotor 37, and the gas passages 46 through 51 can be rotated synchronously by the rotatable shaft 25 driven by the actuator 77.

Air flows, the gas passages, and dehumidifying operation in the dehumidified air generator 11 will be described with reference to the block diagram of FIG. 5. It is assumed in FIG. 5 that the adsorption column 13 is in an adsorbing step, the adsorption column 15 a cooling step, and the adsorption column 17 a desorbing step.

A humid plastic material is dried by dehumidified air in a hopper (which is equivalent to the hopper 78 in FIG. 2), and the dried plastic material is supplied from the hopper into a plastic molding machine (not shown). Humid air discharged from an outlet of the hopper flows into a gas passage 82 and then through a cooler 86 and a filter 84 into an air blower 88. The air blower 88 has an outlet connected to the gas passage 40, which is connected to the stator 39, as described above.

The rotor 37 and the stator 39 jointly serve as a slide valve, as described above. The opening in the stator 39 to which the gas passage 40 is joined communicates with the corresponding opening (not shown) in the rotor 36 in a hermetically sealed relation. In the position shown in FIG. 5, the gas passage 40 is connected in a hermetically sealed relation to the gas passage 46 through the stator 39 and the rotor 37. Likewise, the gas passages 42, 44, 45 are connected in a hermetically sealed condition to the gas passages 48, 50, 51, respectively, through the stator 39 and the rotor 37 in the position of FIG. 5.

The gas passage 46 which is coupled to the gas passage 40 through the stator 39 and the rotor 37 is connected to the inlet/outlet port 52 of the adsorption column 13. The adsorption column 13 has an adsorbent bed 90 housed therein and having a cross-sectional area which meets the condition (4) described above and a thickness which meets the condition (5) described above. Similarly, the adsorption columns 15, 17 have respective adsorbent beds 92, 94 housed therein.

The humid air supplied from the gas passage 46 is dehumidified when it flows through the adsorbent bed 90. Dehumidified or dried air from the adsorption column 13 flows through inlet/output port 64, the gas passage 47, the rotor 37, the stator 39 and into the gas passage 41 without leakage. Since the gas passage 41 is connected to a dried air inlet of the hopper, the dried air (which is of a temperature ranging from 60° C. to 170° C.) is supplied into the hopper in which a humid plastic material is dried by the dried air. The air then becomes humid, and fed again into the gas passage 82. The dried plastic material is supplied into the non-illustrated plastic molding machine through the discharge port of the hopper.

The gas passage 41 is branched into a gas passage 81 which is connected to the gas passage 42. Therefore, a portion of the dried air that has been dehumidified by the adsorption column 13 is supplied via the gas passage 42, the stator 39, the rotor 37, and the gas passage 48 into the adsorption column 15 to cool the adsorption column 15 after it has been desorbed by heated air. The gas passage 81 may have an automatic shutoff valve 97 for saving dried air after the cooling step is carried out.

The dried air flowing out of the adsorption column 15 passes through inlet/output port 66, the gas passage 49, the rotor 37, the stator 39, and the gas passage 43, which is joined to the gas passage 82.

The desorbing step in the adsorption column 1 is effected as follows: Ambient air is drawn through a filter (not shown) into the gas passage 74 by means of an air blower 110. The air thus introduced into and flowing through the gas passage 74 is heated by a heater 114. The heated air (which is of a temperature in the range of from 250° C. to 300° C.) flows through the gas passage 45, the stator 39, the rotor 37, and the gas passage 51, and is then fed through the inlet/outlet port 68 into the adsorption column 17 in which the heated air desorbs the adsorption bed 94 after it has adsorbed a prescribed amount of humidity or humidity over a prescribed period of time. After having desorbed the adsorption bed 94, the heated air flows out of the adsorption column 17 through the inlet/outlet port 56, and is discharged into the atmosphere through the gas passage 50, the rotor 37, the stator 39, and the gas passage 44.

A sensor for detecting when the adsorbent bed is sufficiently desorbed and regenerated may be provided in the gas passage 44 to stop the operation of the air blower 110 and the heater 114 for saving the energy consumed by the air blower 110 and the heater 114.

When the adsorbent bed 90 in the adsorption column 13 is to be desorbed in the position of FIG. 2, the adsorption columns 13, 15, 17, and the rotor 37 are rotated by the actuator 77 to change the steps to be performed by the adsorption columns 13, 15, 17. More specifically, as shown in FIG. 4, the rotatable shaft 37 which supports the adsorption columns 13, 15, 17 and the rotor 37 is rotated together by the actuator 77 to rotate the adsorption columns 13, 15, 17 and the rotor 37 in synchronism. The gas passages 46 through 51 are also rotated about the rotatable shaft 25 without varying their positions relative to the adsorption columns 13, 15, 17 and the rotor 37. The rotor 37 is now angularly displaced with respect to the stator 39. For example, as illustrated in FIG. 5, the gas passages 40, 48 are connected to each other through the stator 39 and the rotor 37, and the gas passages 49, 41 are connected to each other through the rotor 37 and the stator 39, so that the adsorption column 15 is switched from the cooling step to the adsorbing step. At the same time, the gas passages 45, 47 are connected to each other and the gas passages 46, 44 are connected to each other to switch the adsorption column 13 from the adsorbing step to the desorbing step. The gas passages 42, 50 are coupled to each other and the gas passages 51, 43 are coupled to each other to switch the adsorption column 17 from the desorbing step to the cooling step.

Thereafter, each of the adsorption columns 13, 15, 17 can repeat the cycle of the adsorbing, desorbing, and cooling steps to continuously supply dried air into the hopper of the plastic molding machine while regenerating the adsorbent beds 90, 92, 94, successively.

In FIG. 4, the weights of the adsorption columns and the gas passages are borne by the rotatable shaft 25 and the support base 76, but not by the rotor 37 and the stator 39. Therefore, the rotor 37 and the stator 39 may be of relatively small dimensions, and the sealing ability of the slide valve composed of the rotor 37 and the stator 39 may be increased.

For replacing the adsorbents in the adsorption columns 13, 15, 17, the covers 19, 21, 23 are detached to open upper ends thereof. Then, the adsorbents in the adsorption columns 13, 15, 17 are replaced with new adsorbents. The replacement can be effected more efficiently than it is if the rotors and the stators are positioned above and below the adsorption columns.

Since the vertical positions of the three adsorption columns 13, 15, 17 are the same, the overall height of the dehumidified air generator 11 is small. Even if more than three adsorption columns are employed, the height of the dehumidified air generator is held at a low level, while a desired dehumidifying efficiency is attained. Each of the adsorption columns is projected onto the horizontal plane in the shape of a sector and the three adsorption columns combined together are projected onto the horizontal plane in the shape of a circle. This arrangement reduces the installation space for the dehumidified air generator 11, and hence a space for installation of the dehumidified air generator 11 can easily be obtained.

The adsorption columns 13, 15, 17 may be of a cylindrical shape, a prismatic shape, or any of other suitable shapes, provided they have a sufficient pressure resistance as pressure containers.

Figures 6, 7:
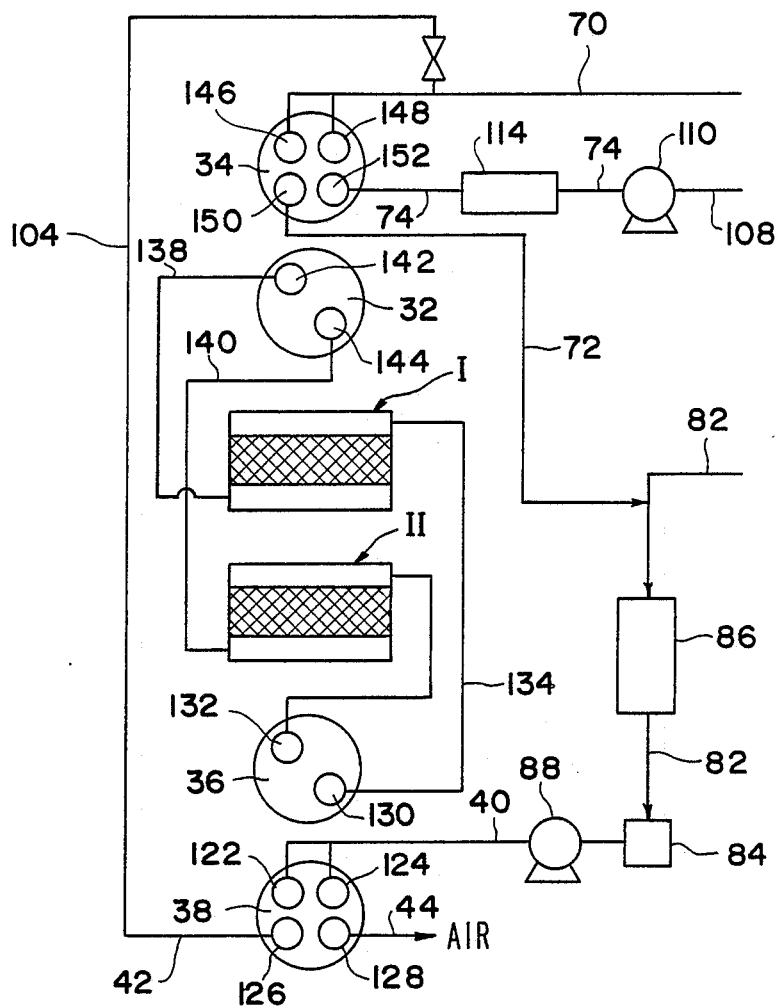
FIG. 6 is a block diagram of a dehumidified air generator according to a third embodiment of the present invention.
FIG. 7 is a diagram showing cycles of operation of the dehumidified air generator according to the third embodiment.

FIGS. 6 and 7 show a dehumidified air generator constructed in accordance with a third embodiment of the present invention. The dehumidified air generator shown in FIG. 6 is a modification of the dehumidified air generator according to the first embodiment. Those parts of FIG. 6 which are identical to those shown in FIG. 2 are denoted by identical reference numerals.

The dehumidified air generator illustrated in FIGS. 6 and 7 have two adsorption columns I, II. A stator 38 has four openings 122, 124, 126, 128 defined therein, whereas a rotor 36 slidable held against the stator 38 has two openings 130, 132. The opening 130 in the rotor 36 is connected to a gas passage 134 communicating with the adsorption column I, and the other opening 132 is connected to a gas passage 136 communicating with the adsorption column II. The adsorption columns I, II are coupled respectively to gas passages 138, 140 which are in turn connected to two openings 142, 144, respectively, defined in a rotor 32. The rotor 32 is slidably held against a stator 34 which has four openings 146, 148, 150, 152 defined therein.

The openings 122, 124 in the stator 38 are connected to a gas passage 40 for supplying humid air that is to be dehumidified by the dehumidified air generator. The opening 126 in the stator 38 is connected to a gas passage 42 for supplying dried air which is to be used in a cooling step. The opening 128 is connected to a gas passage 44 for discharging heated air used in a desorbing step into the atmosphere. The openings 146, 148 in the stator 34 are connected to a gas passage 70 for supplying dried air into a hopper. The opening 150 is coupled to a gas passage 72 for delivering dried air used in a cooling step into a gas passage 82. The opening 152 is connected to a gas passage 74 for supplying heated air to be used in a desorbing step.

While an adsorbing step is being carried out by one of the adsorption columns I, II, a desorbing step and a cooling step are successively effected by the other adsorption column.

In order to enable the adsorption column I to effect the adsorbing step, the opening 130 in the rotor 36 is aligned with either one of the openings 122, 124 in the stator 38, and the opening 142 in the rotor 32 is aligned with either one of the openings 146, 148 in the stator 34.

In order to enable the adsorption column I to carry out the desorbing step, the rotors and the stators are angularly displaced relatively to each other to bring the openings 130, 128 into registration with each other and the openings 142, 152 into registration with each other.

In order to enable the adsorption column I to effect the cooling step, the opening 130 in the rotor 36 is aligned with the opening 126 in the stator 38, and the opening 142 in the rotor 32 is aligned with the opening 150 in the stator 34.

Similarly, the adsorbing, desorbing, and cooling steps can successively be repeated by the adsorption column II by angularly displacing the rotors and the stators relatively to each other. It is preferable to perform dehumidifying/regenerating cycles in the adsorption columns I, II in the sequence shown in FIG. 7. In each of the first and second cycles, righthand steps are carried out after lefthand steps. The reference characters A, D, C. in FIG. 7 means the adsorbing step, the desorbing step, and the cooling step, respectively.

Figures 8, 9:
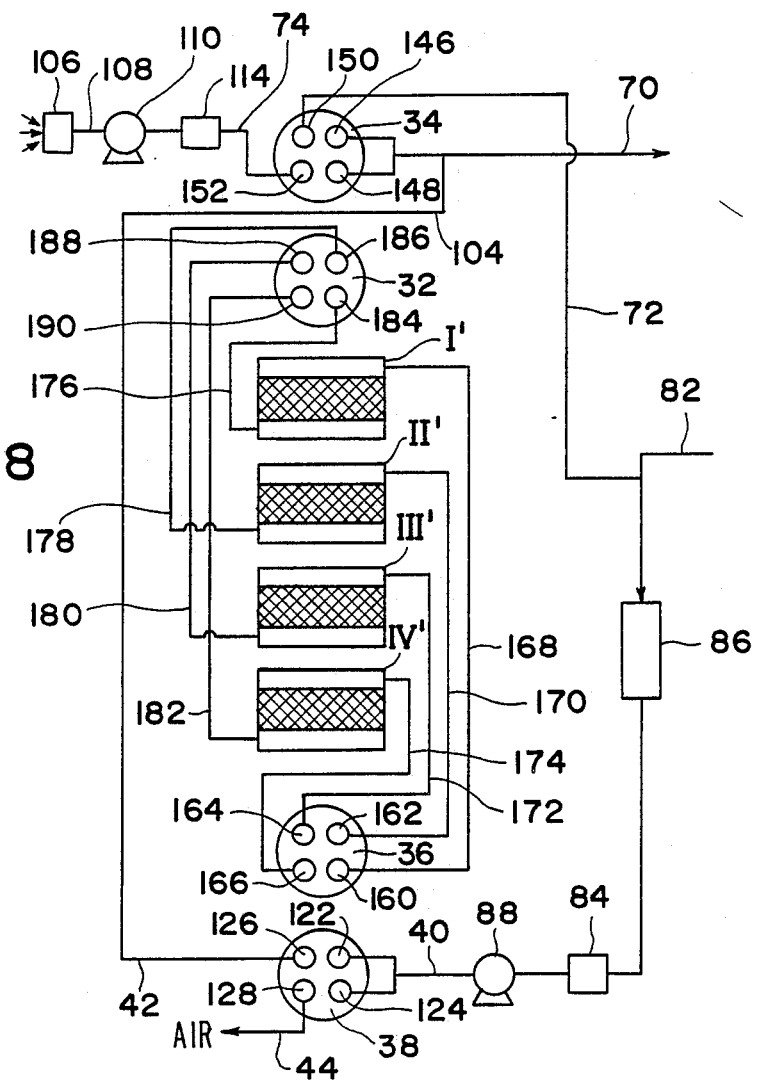
FIG. 8 is a block diagram of a dehumidified air generator according to a fourth embodiment of the present invention.
FIG. 9 is a diagram showing cycles of operation of the dehumidified air of the fourth embodiment.

A dehumidified air generator according to a fourth embodiment of the present invention shown in FIGS. 8 and 9 has four adsorption columns I', II', III', IV'. Rotors 32, 36 have four openings 184, 186, 188, 190 and four openings 160, 162, 164, 166, respectively, which are connected to the adsorption columns I', II', III', IV' through gas passages 168, 170, 172, 174, 176, 178, 180, 182. The adsorption columns I', II', III', IV' repeat cycles of adsorbing, desorbing, and cooling steps as shown in FIG. 9 by angularly displacing the rotors and the stators relatively to each other. The reference characters A, D, C in FIG. 9 indicate the adsorbing, desorbing, and cooling steps, respectively. Operation of the dehumidified air generator of the fourth embodiment is basically the same as that of the previous embodiments, and will not be described in detail.

FIGS. 10A through 10F, 13 and 14 show a dehumidified air generator according to a fifth embodiment of the present invention, the dehumidified air generator having two adsorption columns as with the third embodiment shown in FIGS. 6 and 7. The dehumidified air generator of the fifth embodiment only has one pair of a rotor 232 and a stator 234 below adsorption columns I, II. The adsorption columns I, II and the rotor 232 and stator 234 are supported by only a lower support device, with any structure above the adsorption columns I, II being simplified. Therefore, components such as the rotatable shaft 28, the stator 32, the rotor 32, etc., above the adsorption column 12 in the first embodiment of FIG. 1 are not required in the fifth embodiment. As a result, the overall height of the dehumidified air generator is lowered.

Figure 10A:
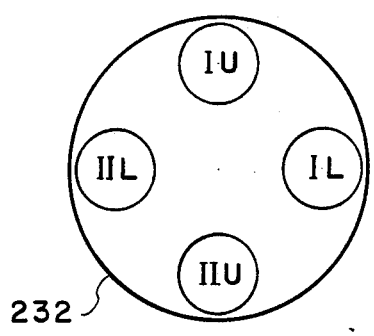
FIG. 10A is a plan view of a rotor used in a dehumidified air generator according to a fifth embodiment of the present invention.
Figure 10B:
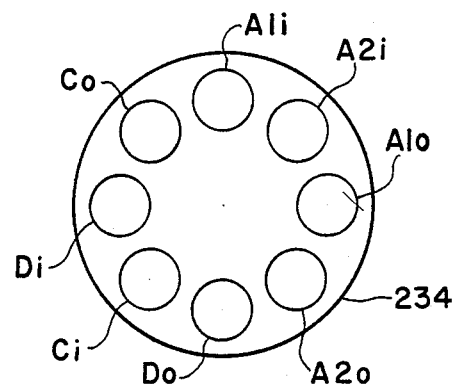
FIG. 10B is a plan view of a stator used in the dehumidified air generator of the fifth embodiment.
Figure 10C:
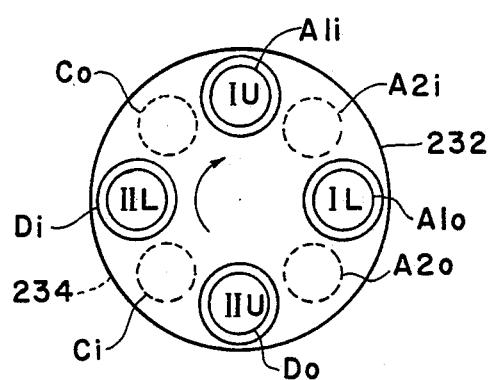
FIGS. 10C, 10D, 10E, and 10F are plan views illustrating the rotor of FIG. 10A and the stator of FIG. 10B which are combined with each other.
Figure 10D:
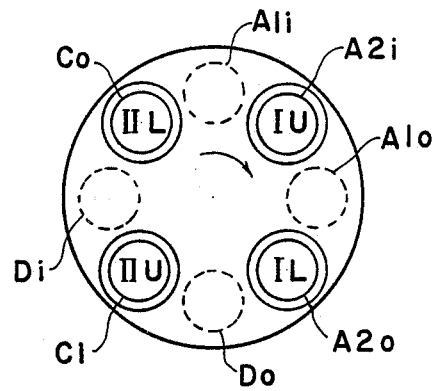
Figure 10E:
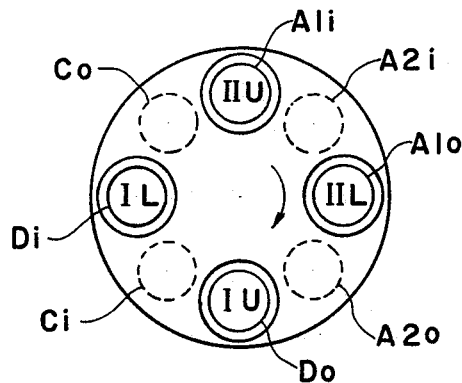
Figure 10F:
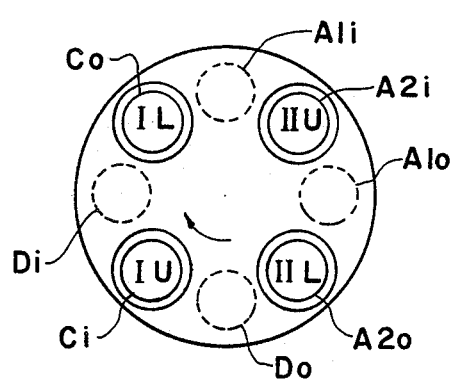

The rotor 232 and the stator 234, which are provided only in one pair, rather than two pairs as with the third embodiment, are shown in FIGS. 10A and 10B.

The rotor 232 shown in FIG. 10A has four openings to which there are connected four respective gas passages communicating with inlet/outlet ports of the two adsorption columns I, II. In FIG. 10A, the reference characters "U", "L" indicate that the openings denoted by U are connected to the upper inlet/outlet ports of the adsorption columns and the openings denoted by L are connected to the lower inlet/outlet ports of the adsorption columns, and the reference characters "I", "II" represent that the openings denoted by I, II are connected to the adsorption columns I, II in FIG. 13 which are the same as those shown in FIG. 6.

The stator 234 shown in FIG. 10B has eight openings which are indicated by reference characters "A", "D", "C" that are defined in FIG. 7. One adsorption column is used in the adsorbing step over two stages that are indicated by A1, A2. The reference characters i, o indicate inlet and outlet openings. In the stator/rotor position of FIG. 13, the openings A1i, A2i are connected to a gas passage 40, the openings A1o, A2o to a gas passage 70, the opening Di to a gas passage 74, the opening Do to a gas passage 44, the opening Ci to a gas passage 42, and the opening Co to a gas passage 72.

The rotor 232 and the stator 234 which are disposed below the adsorption columns I, II are combined in various relative angular positions in different steps, as shown in FIGS. 10C through 10F, the views being seen from above the rotor 232. The steps A, D, C per cycle are performed in the four positions shown in FIGS. 10C through 10F. The arrows in FIGS. 10C through 10F indicate the direction and angle of rotation of the rotor 232 to reach each of the steps.

Figure 11:
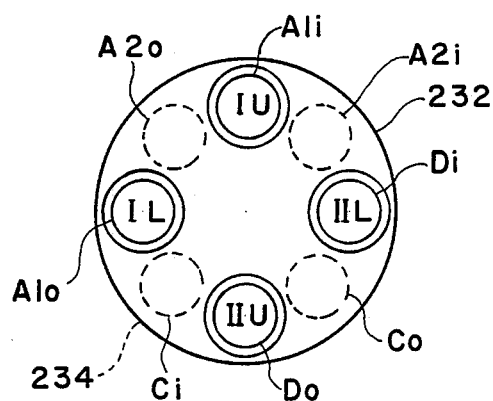
FIG. 11 is a plan view of the stator and the rotor which are combined with each other in a different pattern from those shown in FIGS. 10C through 10F.

The rotor 232 and the stator 234 may be combined in a relative angular position as shown in FIG. 11, in addition to the relative angular positions illustrated in FIGS. 10A through 10F.

The rotor 232 and the stator 234 shown in FIGS. 10A through 10F may be positioned above the adsorption columns I, II.

Figure 13:
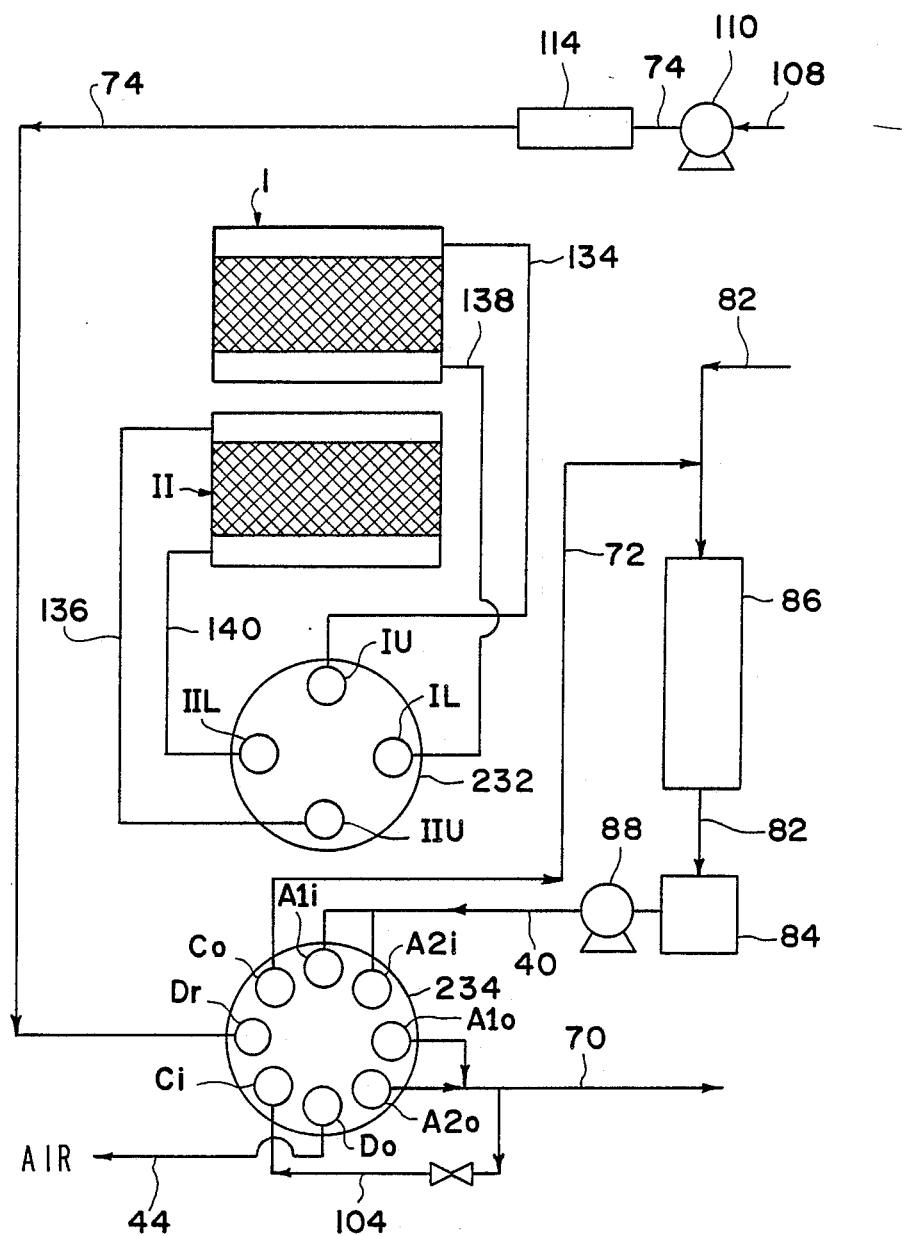
FIG. 13 is a block diagram of the dehumidified air generator according to the fifth embodiment.
Figure 14:
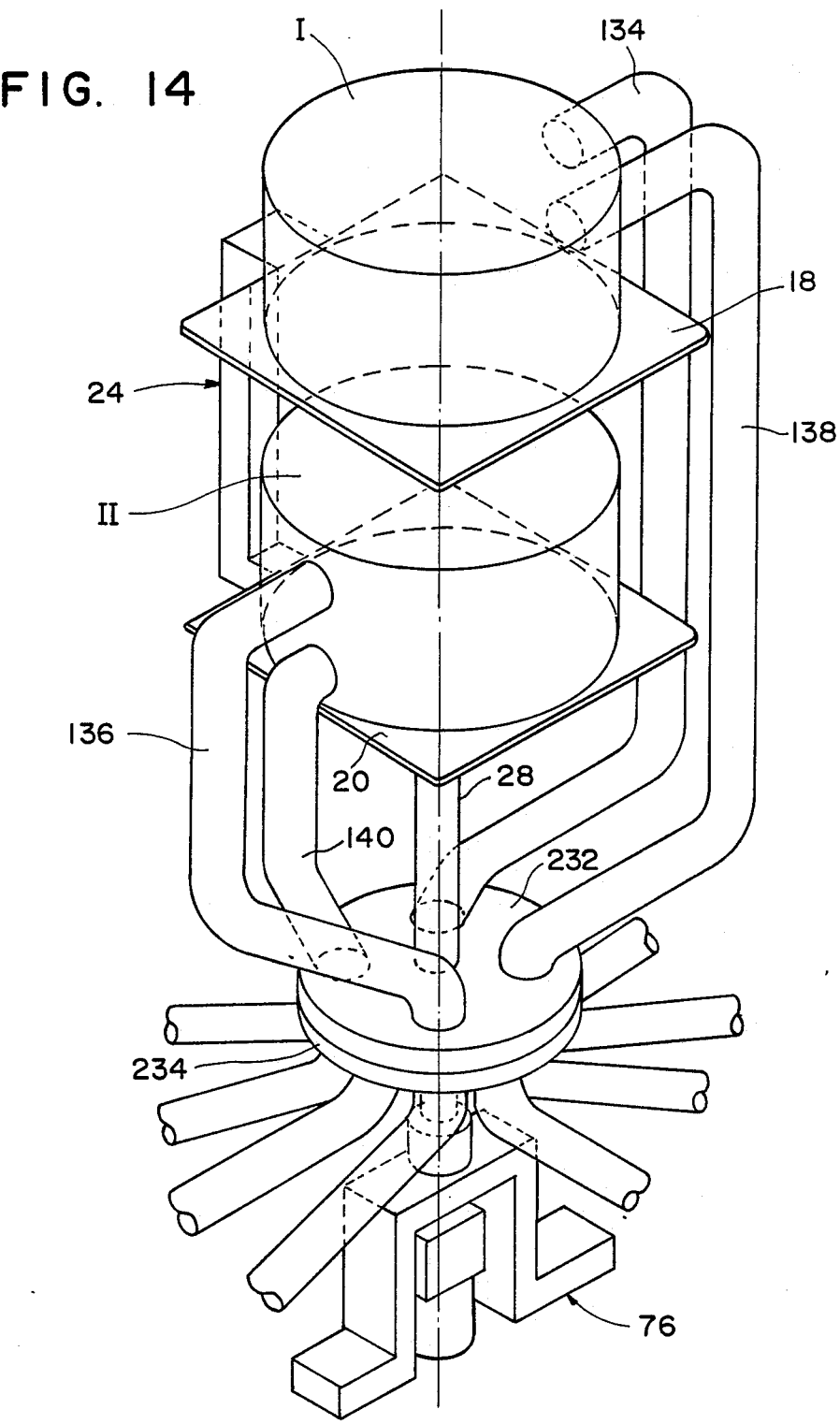
FIG. 14 is a perspective view of the dehumidified air generator of the fifth embodiment.

FIG. 13 shows in block form the dehumidified air generator of the fifth embodiment which has the rotor 232 and the stator 234. Those parts in FIG. 13 which are identical to those of the embodiment of FIG. 6 are denoted by identical reference numerals. FIG. 14 shows the fifth embodiment of the dehumidified air generator in perspective. Those components shown in FIG. 14 which are identical to those of the embodiment of FIG. 1 are designated by identical reference numerals. The structure and operation of the dehumidified air generator shown in FIGS. 13 and 14 are basically the same as described above, and will not be described in further detail.

While the openings connected to the upper adsorbent bed are indicated by U and those connected to the lower adsorbent bed are indicated by L in FIGS. 10A through 10F and 11, the direction in which air passes through the absorbents is not limited to the vertical direction in the third through fifth embodiments.

As with the second embodiment, only one pair of a rotor and a stator may be disposed above or below the three adsorption columns shown in FIGS. 1, 2, and 3, so that the side of the adsorption columns which is free from any rotor and stator may be simplified in structure. With such an arrangement the overall height of the dehumidified air generator is reduced to meet space saving requirements. One specific structure according to such a modification will be described below.

FIGS. 12A through 12E illustrate a dehumidified air generator according to a sixth embodiment, which is a modification of the first embodiment, the dehumidified air generator having only one pair of a rotor and a stator.

Figure 12A:
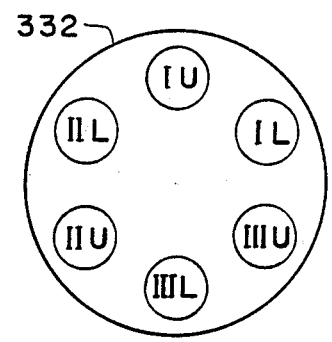
FIG. 12A is a plan view of a rotor used in a dehumidified air generator according to a sixth embodiment of the present invention.
Figure 12B:
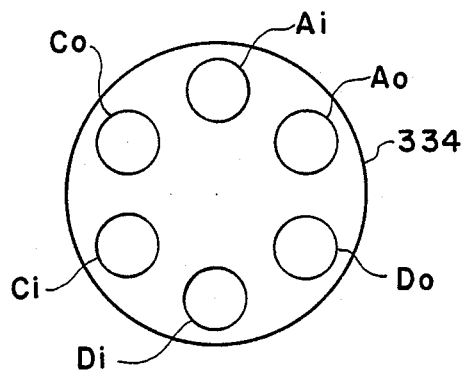
FIG. 12B is a plan view of a stator used in the dehumidified air generator of the sixth embodiment.

FIGS. 12A shows a rotor 232 and FIG. 12B shows a stator 234. Various reference characters in FIGS. 12A through 12E are defined in the same manner as in FIGS. 10A through 10F, except for a reference character "III", which indicates the third adsorption column being added. According to the sixth embodiment, a dehumidifying step is carried out in the same cycle as in the second embodiment.

Figure 12C:
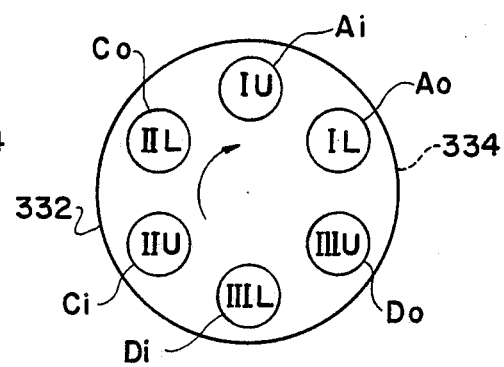
FIGS. 12C, 12D, and 12E are plan views showing the rotor of FIG. 12A and the stator of FIG. 12B which are combined with each other
Figure 12D:
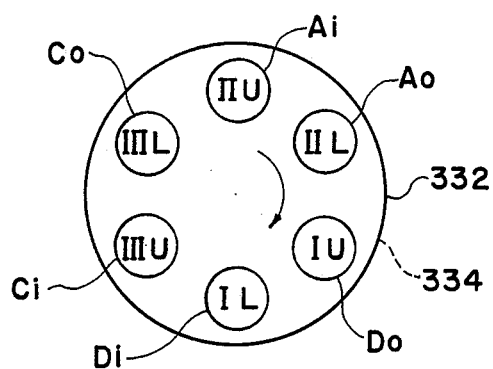
Figure 12E:
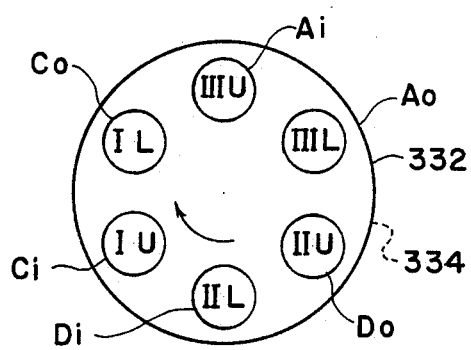

The rotor 232 and the stator 234 are combined in various relative angular positions in different steps, as shown in FIGS. 12C through 12E, the views being seen from above the rotor 232. The steps A, D, C per cycle are performed in the three positions shown in FIGS. 12C through 12E. The arrows in FIGS. 12C through 12E indicate the direction and angle of rotation of the rotor 232 to reach each of the steps.

The dehumidified air generator having three adsorption columns as with the first embodiment has a considerably tall height. The dehumidified air generator which has only one pair of a rotor and a stator has a relatively low height and is made up of a reduced number of parts, so that the cost of the dehumidified air generator is lowered.

With the dehumidified air generator having two adsorption columns, while an adsorbing step is being carried out in one of the adsorption columns, two steps, i.e., desorbing and cooling steps, are required to be carried out in the other adsorption column. In addition, since the dehumidified air generator with two adsorption columns is intermittently operated, it is necessary to increase the capacity of the desorbing devices (such as a heater and an air blower). According to the dehumidified air generator having three adsorption columns, however, the adsorbing, desorbing, and cooling steps are effected simultaneously, and the capacity of the desorbing devices (such as a heater and an air blower) may be reduced to half of that of the dehumidified air generator with two adsorption columns. Because of these practical merits, a large-sized dehumidified air generator should advantageously have three adsorption columns.

The term "adsorption column" used herein signifies a region or member housing an adsorbent, and does not include upper and lower empty spaces or pipe portions.

In the first embodiment, two pairs of rotors and stators may be disposed respectively above and below the adsorption columns, or one pair of a rotor and a stator may be disposed only above or below the adsorption columns. With only one pair of a rotor and a stator being located above or below the adsorption columns, the rotor has four openings and the stator has eight openings if there are two adsorption columns used, and each of the rotor and the stator has sixth openings if there are three adsorption columns used.

According to the first embodiment, since the adsorption columns are vertically stacked and are projected onto a common horizontal plane in at least partly overlapping shapes, the installation area or space for the dehumidified air generator may be as wide as that for a dehumidified air generator having a single adsorption column. As a result, the installation area is greatly reduced, an improvement which has not been achieved by the conventional dehumidified air generators. With respect to the greatly reduced installation area, each of the adsorption columns used can meet the conditions (4) and (5) referred to above, i.e., has an appropriate adsorbent layer cross-sectional area and a required adsorbent layer thickness.

Additionally, if only one pair of a rotor and a stator is provided only above or below the adsorption columns, the vertical dimension of the dehumidified air generator is further reduced to reduce a necessary installation space.

In the second embodiment, the dehumidified air generator has a plurality of adsorption columns having respective adsorbent beds and rotatable simultaneously, a rotor coupled to the adsorption columns and rotatable in synchronism therewith, and a stator fixedly positioned in confronting relation to the rotor, the rotor and the stator serving as a directional control valve for switching between adsorbing and regenerating steps in the adsorption columns. There are three adsorption columns used, and the rotor and the stator are disposed below the adsorption columns. The three adsorption columns are held in substantially the same vertical position, and supported by a vertical rotatable shaft.

According to the second embodiment, any structure present above the adsorption columns is simplified, and the adsorbents filled in the respective adsorption columns can easily be replaced from above the adsorption columns. Since the vertical positions of the adsorption columns are substantially the same, each of the adsorption columns used can meet the conditions (4) and (5) referred to above, i.e., has an appropriate adsorbent layer cross-sectional area and a required adsorbent layer thickness, without increasing the height of the overall dehumidified air generator.

With the present invention, the rotor and the stator jointly constitute a directional control valve, and adsorbing and regenerating steps in each of the adsorption columns can be switched over by rotating the rotor to angularly displace the rotor and the stator relatively to each other. Because the openings in the rotor are connected to the corresponding inlet/outlet ports defined in the outer walls of the adsorption columns through gas passages, the adsorption columns can be smoothly operated even if the dehumidified air generator has a system of tubes or gas passages which meets the conditions (1) through (3) referred to above.

Moreover, inasmuch as the adsorption columns are attached to and supported on the support device or the rotatable shaft, the weights of the adsorption columns are not borne by the rotor and the stator. As a consequence, the rotor and the stator may be reduced in size, and the sealing ability of the directional control valve is increased.

According to another embodiment, where there are three adsorption columns, the adsorption columns can effect adsorbing, desorbing, and cooling steps, respectively, to permit efficient continuous operation for air dehumidification.

It is preferable in the first embodiment that the gas passages be positioned or gathered on one lateral side of the adsorption columns to allow the other lateral side to be used as a working space for maintenance such as adsorbent replacement.

In relation to the condition (4), the cross-sectional area of air in each of the adsorption columns should be 15 to 50 times (4 to 7 times if the inside diameter is concerned) the transverse cross-sectional area of pipes or gas passages for delivering adsorbing air. This area ratio is not disclosed in FIGS. 2 and 4 of Japanese Laid-Open Patent Publication No. 49-7166. Therefore, the present invention can satisfy the condition (4) which cannot be met by the invention disclosed in FIG. 2 or 4 of Japanese Laid-Open Patent Publication No. 49-7166.

In the first embodiment, the rotatable shaft may not necessarily be positioned in the center of the adsorption columns. While the adsorption columns should preferably be projected onto the horizontal plane in the fully overlapping shapes, they may be projected in relatively displaced shapes, but should be projected in at least partly overlapping shapes.

In the second embodiment, each of the adsorption columns is projected onto the horizontal plane in the shape of a sector, and the three adsorption columns are positioned such that they are projected onto the horizontal plane in the shape of a circle, the adsorption columns being supported on the rotatable shaft at the vertexes of the sectors. Alternatively, each of the adsorption columns may be cylindrical in shape or of any of desired shapes. However, the region of the adsorption column which stores the adsorbent should preferably be projected onto the horizontal plane in a shape including arcuate lines and fewer straight lines for applications in which high pressures are expected.

Except when the adsorption columns are horizontally arranged, the adsorbent beds housed in the adsorption columns are not required to be oriented such that dehumidified air flows vertically therethrough, but may be oriented such that dehumidified air flows horizontally or obliquely to the vertical direction.

A gas to be dehumidified by the dehumidified air generator of the invention is not limited to air, but all kinds of gases may be dehumidified by the dehumidified air generator of the invention insofar as such gases do not adversely affect the adsorbents used.

The adsorbents that can be used in practice are not limited to molecular sieves (with the temperature of desorbing air at the inlet ports of the adsorption columns being in the range of from 250° C. to 300° C. under normal condition), but other adsorbents such as of silica gal, alumina, or a fibrous material such as paper in the form of a honeycomb structure may be employed.

In the adsorbing step, the direction of air to be dehumidified is not limited to the downward direction.

The principles of the present invention may be applied to a dehumidified air generator which does not satisfy the conditions (1) through (5).

In cases where the condition (5) is to be met, i.e., the cooling step is to be carried out by using dried air, a portion of dehumidified air may be returned under the pressure of an air blower for the dried air, or another air blower may be used solely for recycling cooling air.

The actuator or power source for rotating the rotor or rotors in synchronism with the adsorption columns may comprise a motor for rotating the adsorption columns, or another actuator or power source. The tubes or gas passage may be used as a small portion or an almost entire portion of the support device by which the adsorption columns are supported.

Where there are two adsorption columns used, a suitable means may be provided for shutting off the introduction of dried air into an adsorption column after the time required to effect a cooling step in that adsorption column has elapsed, i.e., after the cooling step is over, in order to prevent wasteful consumption of the dried air used in the cooling steps. Such means may include an additional opening defined in the stator.

Although certain preferred embodiments have been shown and described, it should be understood that many changes and modifications may be made therein without departing from the scope of the appended claims.

I claim:
1. A dehumidified gas generator comprising:
 (a) adsorbing means for dehumidifying gas including a plurality of simultaneously rotatable adsorption columns having respective adsorbent beds of predetermined thickness housed therein, said adsorption columns being divided into a plurality of chambers housing adsorbents of said adsorbent beds, disposed in different vertical positions and divided vertically from each other and projected onto a horizontal plane in at least partly overlapping shapes;
 (b) a rotor rotatable in synchronism with said adsorption columns and having a plurality of openings defined therein;
 (c) a stator fixedly disposed in confronting relation to said rotor, and said stator jointly serving as a directional control valve for switching between adsorbing and regenerating steps in each of said adsorption columns;
 (d) means for coupling said plurality of adsorption columns together and rotating the coupled adsorption columns about an axis extending vertically through at least one of said adsorption columns in synchronism with said rotor; and
 (e) tubes having first ends connected to respective openings of said rotor and second ends communicating with inlet/outlet ports defined in outer wall of said adsorbing means for passing a gas to be dehumidified through the adsorbent beds from one surface to the opposite surface of each of the adsorbent beds;
 wherein the adsorbing and regenerating steps in said adsorption columns can be switched by angularly displacing said rotor and said stator with respect to each other with said coupling and rotating means.

2. A dehumidified gas generator according to claim 1, wherein said tubes are disposed in one lateral side of said adsorption columns.

3. A dehumidified gas generator according to claim 1, wherein said rotor and said stator are disposed either above or below said adsorption columns.

4. A dehumidified gas generator according to claim 3, wherein said rotor has four openings, said stator has eight openings, and said plurality of adsorption columns comprise two adsorption columns.

5. A dehumidified gas generator according to claim 3, wherein said rotor has six openings, said stator has six openings, and said plurality of adsorption columns comprise three adsorption columns.

6. A dehumidified gas generator according to claim 1, wherein said coupling and rotating means comprises a plurality of plates for mounting respectively said plurality of adsorption columns, a support device for connecting said plurality of plates together and vertical rotatable shafts mounted to the ends of said support device.

7. A dehumidified gas generator according to claim 6, wherein said support device is disposed along one side of said adsorption columns.

8. A dehumidified gas generator according to claim 7, wherein said coupling and rotating means further comprises a support base for rotatably supporting the rotatable shaft at the lower end of the support device, wherein the weight of said adsorption columns is borne by the support device, the rotatable shaft at the lower end of the support device and the support base.

9. A dehumidified gas generator according to claim 1, wherein independent chambers housing adsorbent of said adsorbent beds are formed for each adsorption column with spaces created above and below the adsorbents, said adsorption columns defining vertical flow passages through said respective adsorbent beds.

* * * * *